United States Patent
Sun

(10) Patent No.: US 7,627,242 B2
(45) Date of Patent: Dec. 1, 2009

(54) REFLECTING MIRROR WITH CONNECTING ARM

(76) Inventor: Chia Chi Sun, 4F, No. 218, Chung An St., Chungho, Taipei, 235 (TW)

( * ) Notice: Subject to any disclaimer, the term of this patent is extended or adjusted under 35 U.S.C. 154(b) by 217 days.

(21) Appl. No.: 11/826,789

(22) Filed: Jul. 18, 2007

(65) Prior Publication Data

US 2009/0021850 A1    Jan. 22, 2009

(51) Int. Cl.
*G03B 11/00* (2006.01)
(52) U.S. Cl. .................. 396/544; 396/383; 396/385; 396/376
(58) Field of Classification Search .................. 396/544
See application file for complete search history.

(56) References Cited

U.S. PATENT DOCUMENTS

| | | | |
|---|---|---|---|
| 6,549,237 B1 * | 4/2003 | Inuma et al. | 348/333.06 |
| 2006/0109364 A1 * | 5/2006 | Sun | 348/333.06 |
| 2007/0025724 A1 * | 2/2007 | Watanabe | 396/287 |

* cited by examiner

*Primary Examiner*—Melissa J. Koval
*Assistant Examiner*—Bret Adams

(57) ABSTRACT

The present invention is a new structure of reflecting mirror, which includes a hollow frame, a connecting arm, and a cover. In particular, a pivot base is configured on one side of the hollow frame, which is pivotally connected another pivot base on the cover side with a connecting arm for fixedness. While the frame is flipped with one side as a pivot, a user can watch and inspect images shown on the display from multiple angles and directions.

3 Claims, 4 Drawing Sheets

REFLECTING MIRROR WITH CONNECTING ARM

BACKGROUND OF THE INVENTION

1) Field of the Invention

The present invention relates to a new structure of reflecting mirror) which is installed around the liquid crystal display of a digital camera for image reflection. By way of reflection, the user is allowed to view images on the display from multiple visual angles or directions.

2) Description of the Prior Art

With new technologies constantly emerging, a large number of electronic products in the market are being digitalized; meanwhile, using digital cameras to take pictures as records in lives has become a popular life style as a result of leisure activities prevailed.

The inventor ever invented a refracting device for display of digital camera with registered number M262742 in Taiwan. The objective of that device installed on a digital camera is to provide a user to view images on the display even from an angle of optical dead-zone through the refracting device mounted on the display when a user requires taking pictures at a multitudinous scene or at the occasion that needs special view-finding angle, or needs to raise/lay down a camera for a wide-angle shot.

Furthermore, because many users trying self-shots with digital cameras need to take pictures through reflection of lens or intuition, some repeated shots to verify objects within the intended scope lead to inconvenience in utilization. In addition, the fact that two sets of upper and lower rotating arms on the previous invention are used for raising or laying-down of a camera only results in extra consumption in processing and manufacture expenses.

Thus, to eliminate the above-mentioned drawbacks, the inventor invents a new structure of the reflecting mirror that meets image viewing on a display from multiple angles or directions with a connecting arm pivotally connecting the hollow frame and the cover as a resolution to simplify procedures in assembly and reduce cost.

Referring to FIG. 1 for the known reflecting device 3, in which the reflecting device 3 is fixed around the display 11 of a digital camera 1, and a real-time image through the lens 12 can be observed on the display 11 via the reflecting mirror 4 of the reflecting device 3 by a user who raises or lays down a camera.

Further, pivot bases 31 and 31' of the reflecting device 3 are configured on the central location beside left and right sides of the frame 33, which can be pivotally linked to the reflecting mirror 4 with two rotating arms 32 and 32' for image observation on the display 11 after flipping. Thus, this device can solve an issue of visual dead-zone on the display 11. However, with self-shot activities of using digital cameras popularized nowadays, the reflecting device 3 provides a single method of raising or laying down a camera to observe images through the reflecting mirror 4. In this regard, this device fails to offer an alternative to view images shown on the display 11 from a viewing angle ahead a camera or from multiple angles as well as directions.

SUMMARY OF THE INVENTION

The new structure of reflecting mirror is a device of reflecting mirror containing a hollow frame, a connecting arm, and a cover. Wherein two pivot bases are installed on ends of the hollow frame and the cover respectively to pivotally link the connecting arm, and a reflecting plate is configured within the cover to provide the cover for freely flipping with multiple angles or directions that a user can observe images shown on the liquid crystal display through the reflecting plate.

The objective of this invention, the new structure of the reflecting mirror, is to provide a connecting arm to pivotally link the hollow frame and the cover and view images on the display from multiple angles and directions according to reflection on the reflection plate.

In this regard, the said description for the present invention may correspond with conditions of patent application. To further describe the technical details of the present invention, the preferred embodiments together with the accompanying drawings are described in the following:

DETAILED DESCRIPTION OF THE PREFERRED EMBODIMENTS

Figure 1:
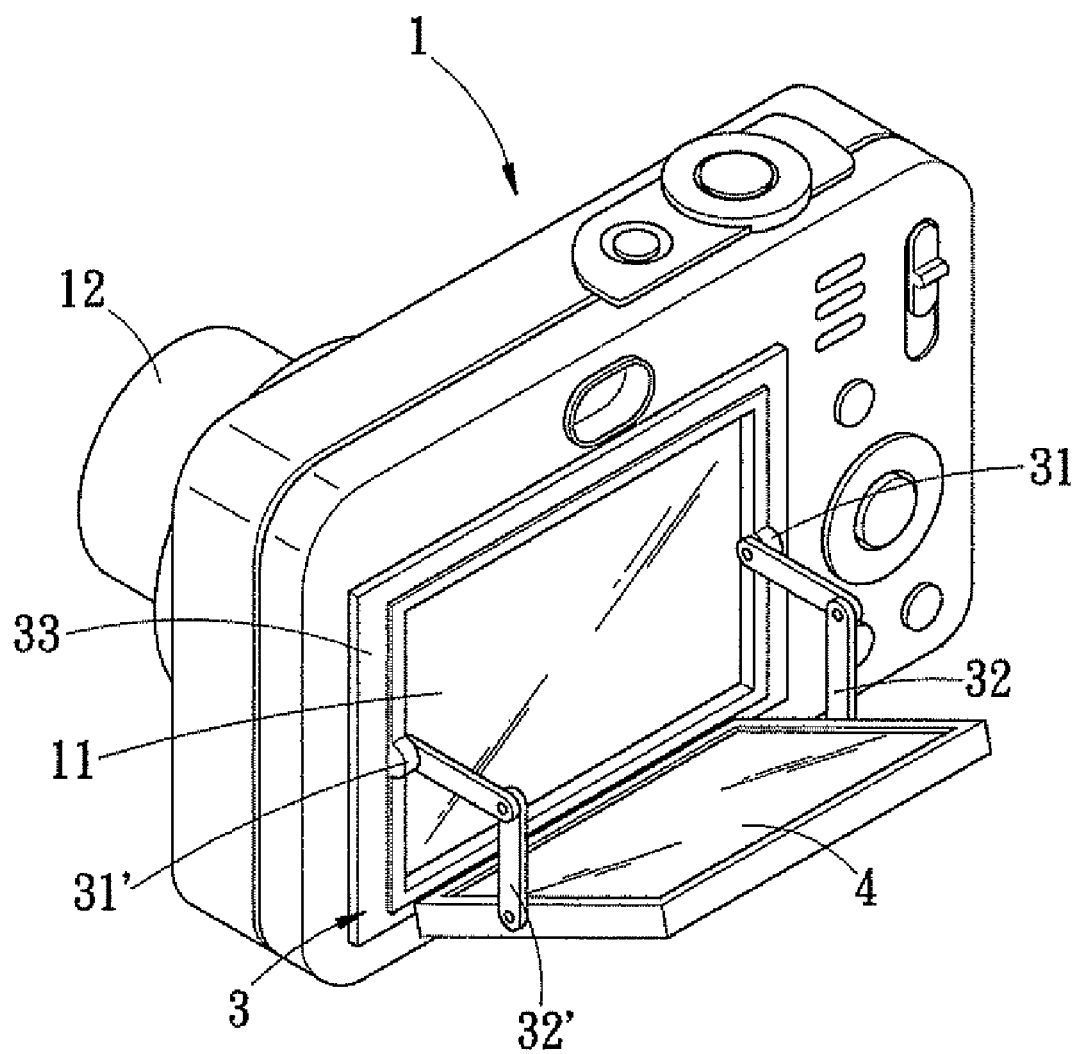
FIG. 1 is a 3-dimensional view of a known reflecting device.
Figure 2:
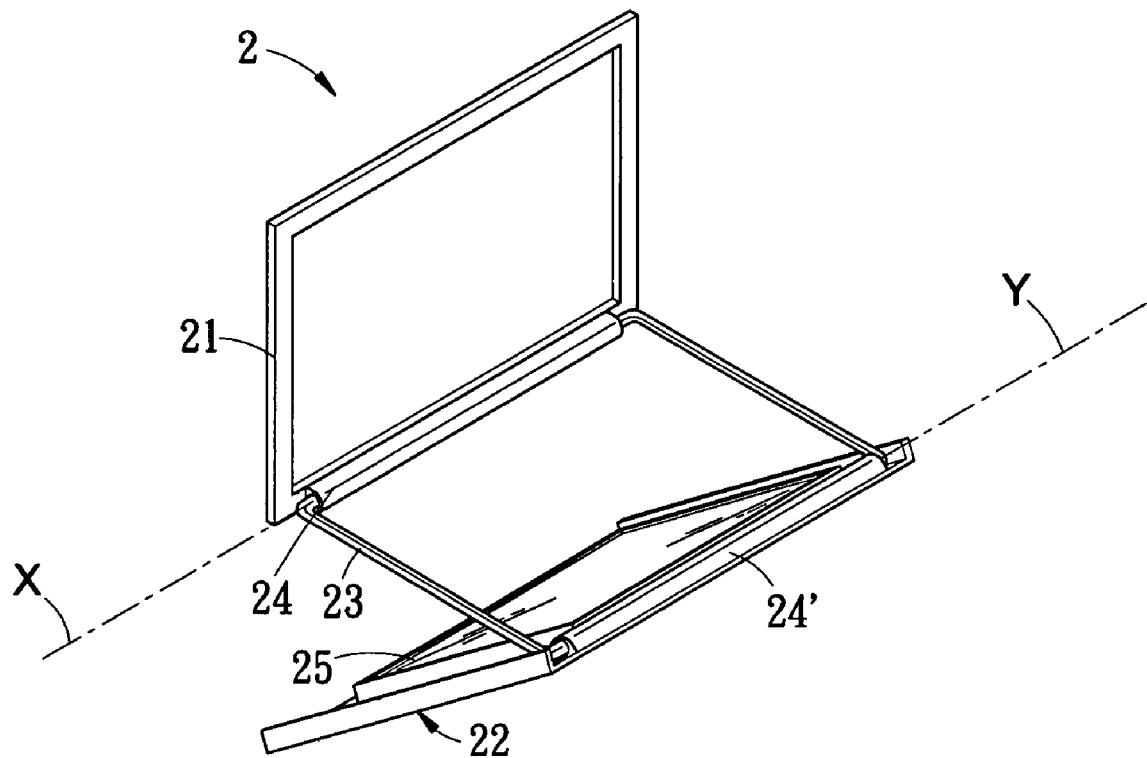
FIG. 2 is a 3-dimensional view of the present invention, the new structure of reflecting mirror.
Figure 3:
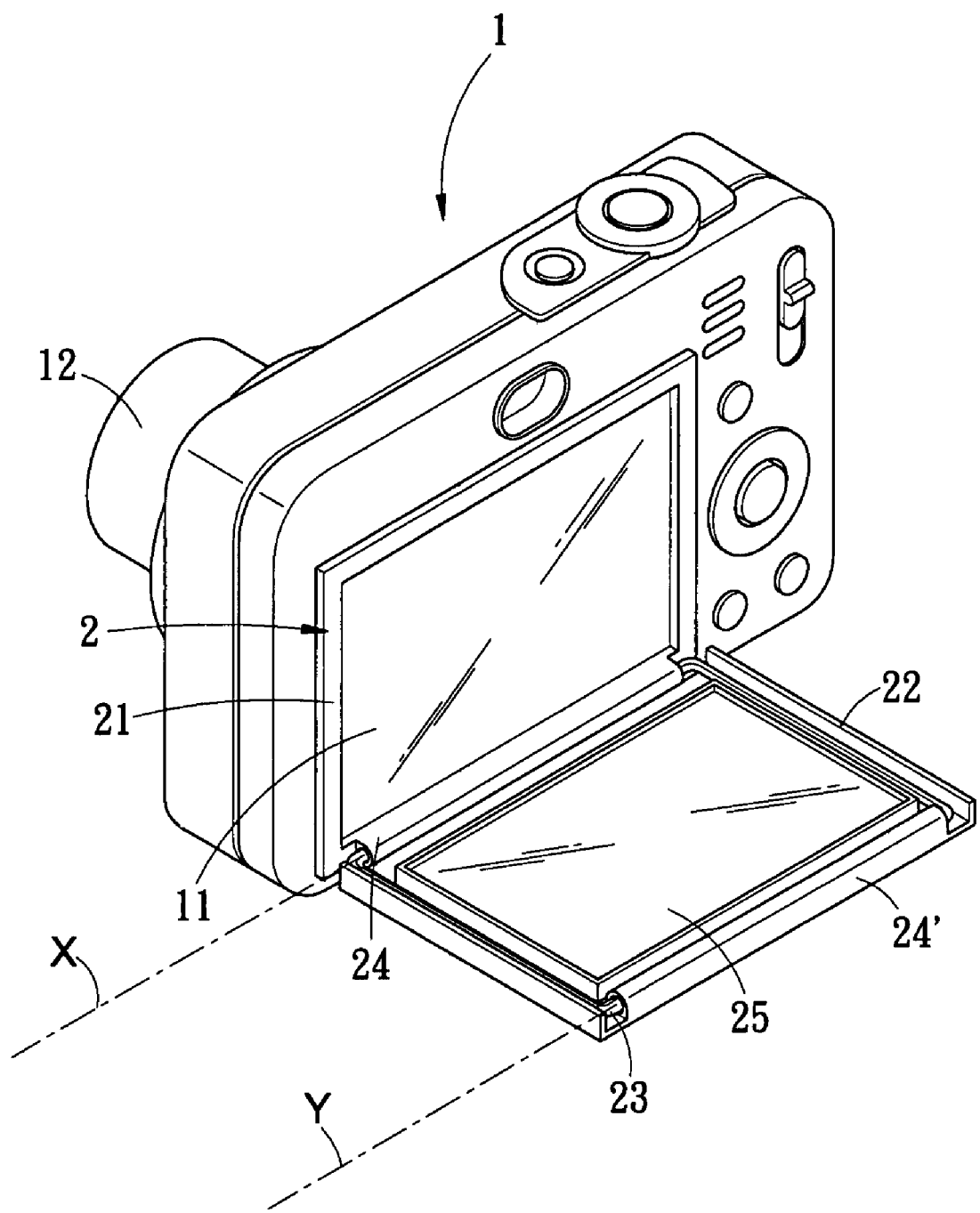
FIG. 3 is an operational view of the present invention, the new structure of reflecting mirror.

Referring to FIG. 2 and FIG. 3: In the present invention, the new structure of reflecting mirror, is mainly a reflecting-mirror device including a hollow frame 21, a cover 22, and a connecting arm 23. Wherein a pivot base 24 is configured on one side of the hollow frame 21, which is pivotally linked to another pivot base 24' on one side of the cover 22 with the connecting arm 23; the pivot base 24' is configured on one side of the cover 22, which is pivotally connected to another pivot base 24 on the corresponding side of the hollow frame 21 and has one reflecting plate 25 installed for image reflection of the display 11; the connecting arm 23 is a connector for the hollow frame 21 and the cover 22; the reflecting mirror 2 is fixed around the display 11 of the digital camera 1.

Further, the reflecting mirror configured around the display 11 of the digital camera 1 with a rotation action based on axes X and Y can supply an opportunity that a user, under random shooting angles, can clearly observe images on the display 11 through the reflecting plate 25 with a fine-tuning mechanism of the reflecting mirror 2.

Figure 4:
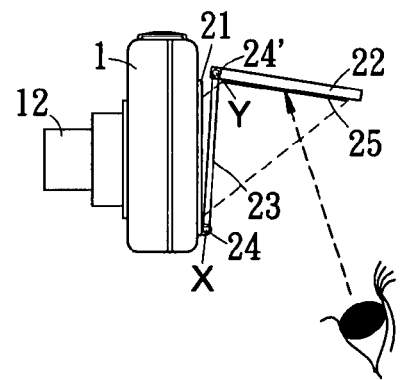
FIG. 4 is an operational view of embodiment of the present invention, the new structure of reflecting mirror.
Figure 5:
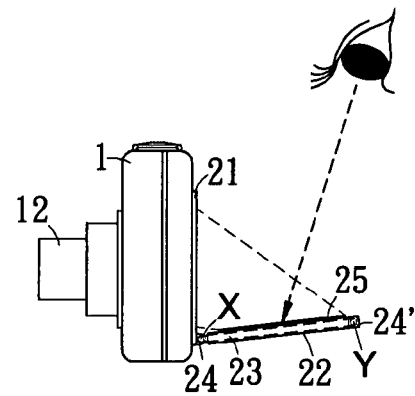
FIG. 5 is an operational view of another embodiment of the present invention, the new structure of reflecting mirror.
Figure 6:
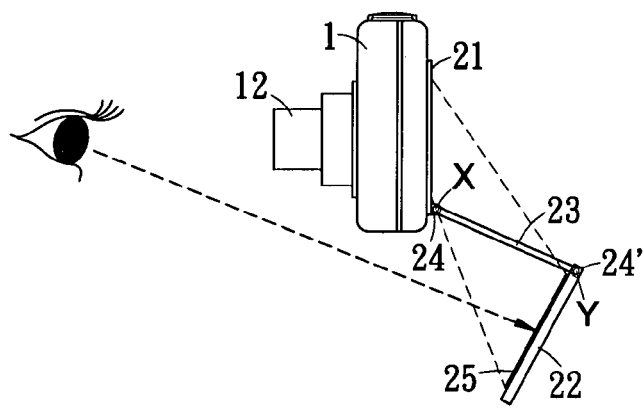
FIG. 6 is an operational view of another embodiment of the present invention, the new structure of reflecting mirror.

1. Moreover, referring to FIG. 4, FIG. 5, and FIG. 6 for operational views of embodiments of the present invention, the new structure of reflecting mirror. Wherein the reflecting mirror 2 is fixed around the display 11 and an image through the lens 12 of the digital camera 1 can be shown on the display 11. A user can rely on pivot bases 24 and 24' installed on the hollow frame 21 as well as the cover 22 to adequately make a fine-tuning of the cover 22 via a link of the connecting arm 23, and observe images shown on the display 11 through the reflecting plate 25 which is made of a mirror-like glass material or a highly shining metal.

Furthermore, for a high angle shot of a camera, a user, relying on the camera's Y-axis, can make an adequate fine-tuning by an upward turn of the cover and inspect images shown on the display 11 via the reflecting plate from a lower position. For a low angle shot, a user, relying on the camera's X-axis, can make an adequate fine-tuning by a downward turn of the cover and observe images shown on the display 11 via the reflecting plate from a higher position. Given a shot ahead the digital camera 1, a user, making an adequate fine-tuning of the cover by relying on axes X and Y, can observe images shown on the display 11 through the reflecting plate 25 from the front position. For any view-finding at a multitudinous scene or at the wide-angle occasion and self-shots, a user cannot be restricted within a visual dead-zone but freely watch images shown on the display from multiple angles or directions because of extension in the scope of visual angles.

The invention claimed is:

1. A new structure of reflecting mirror at least includes:
    a hollow frame, which is a framework for a pivotal link of a connecting arm and a cover, so as to fix around a display of a digital camera;
    said cover is a plate to pivotally link the connecting arm and the hollow frame, and has one reflecting plate configured for image reflection of the display;
    said connecting arm is a pole body for pivotal connection of the hollow frame and the cover;
    wherein one end of the connecting arm is pivotally configured on the hollow frame and another end on the cover approximately forms a Z shape, wherein the cover is flipped upward or downward such that images shown on the display can be watched from different angles through the reflecting plate.

2. A new structure of reflecting mirror as claimed in claim 1, wherein the connecting arm is pivoted beside the hollow frame and the cover.

3. A new structure of reflecting mirror as claimed in claim 1, wherein the reflecting plate is one of a mirror-like glass material or a highly shining metal.

* * * * *